United States Patent
Ohlarik et al.

(10) Patent No.: US 11,609,344 B2
(45) Date of Patent: Mar. 21, 2023

(54) SYSTEMS AND METHODS FOR UTILIZING A MACHINE LEARNING MODEL TO DETERMINE A DETERMINED LOCATION OF A VEHICLE BASED ON A COMBINATION OF A GEOGRAPHICAL LOCATION AND A VISUAL POSITIONING SYSTEM LOCATION

(71) Applicant: Verizon Patent and Licensing Inc., Arlington, VA (US)

(72) Inventors: Derek Wade Ohlarik, Flemington, NJ (US); Mauricio Pati Caldeira De Andrada, South Plainfield, NJ (US); Ashley A. Vogt, Columbus, OH (US); Rejaul Monir, Jamaica Hills, NY (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 365 days.

(21) Appl. No.: 16/842,278

(22) Filed: Apr. 7, 2020

(65) Prior Publication Data
US 2021/0311208 A1 Oct. 7, 2021

(51) Int. Cl.
*G01S 19/48* (2010.01)
*G01S 19/42* (2010.01)
*G06T 7/60* (2017.01)
*G01S 19/45* (2010.01)

(52) U.S. Cl.
CPC ............ *G01S 19/485* (2020.05); *G01S 19/48* (2013.01); *G01S 19/42* (2013.01); *G01S 19/45* (2013.01); *G06T 7/60* (2013.01)

(58) Field of Classification Search
CPC ........ G01S 19/48; G01S 19/485; G01S 19/45; G01S 19/42
USPC .......................... 342/357.31, 357.28, 357.25
See application file for complete search history.

(56) References Cited

U.S. PATENT DOCUMENTS

| | | | |
|---|---|---|---|
| 9,342,888 B2* | 5/2016 | Menashe | G06T 5/006 |
| 10,551,509 B2* | 2/2020 | Song | G06V 20/588 |
| 10,732,635 B2* | 8/2020 | Haque | G05D 1/0285 |
| 10,969,229 B2* | 4/2021 | Akiva | G01C 21/005 |
| 11,195,049 B2* | 12/2021 | Hesch | G06K 9/629 |

(Continued)

OTHER PUBLICATIONS

"Cluster Analysis," Wikipedia, Website: www.wikipedia.org/wiki/Cluster_analysis; Retrieved from website Jan. 21, 2020, 26 Pages.

*Primary Examiner* — Chuong P Nguyen

(57) ABSTRACT

A device may receive, from a vehicle device, a geographical (e.g., GNSS) location of a vehicle, and may utilize the GNSS location as a determined location of the vehicle when the GNSS location satisfies a first threshold. The device may receive, from the vehicle device, an image identifying reference points associated with the vehicle, and may process the image, with a VPS, to calculate a VPS location of the vehicle. The device may utilize the GNSS location of the vehicle as the determined location when the VPS location fails to satisfy a second threshold, and may calculate, when the VPS location of the vehicle satisfies the second threshold, coordinate sets based on groups of coordinate combinations from the GNSS location and the VPS location. The device may process the coordinate sets, with a model, to determine the determined location, and may perform actions based on the determined location.

20 Claims, 13 Drawing Sheets

(56) References Cited

U.S. PATENT DOCUMENTS

| | | | |
|---|---|---|---|
| 2009/0228204 A1* | 9/2009 | Zavoli | G01C 21/30 |
| | | | 701/532 |
| 2012/0062414 A1* | 3/2012 | Sambongi | G01C 21/1656 |
| | | | 342/357.25 |
| 2012/0176491 A1* | 7/2012 | Garin | G01S 19/49 |
| | | | 348/113 |
| 2020/0234042 A1* | 7/2020 | Rogan | H04N 5/23222 |
| 2020/0234062 A1* | 7/2020 | Rogan | G01C 21/3644 |
| 2020/0363807 A1* | 11/2020 | Haque | G05D 1/0274 |
| 2022/0026213 A1* | 1/2022 | Song | G01C 21/1656 |

* cited by examiner

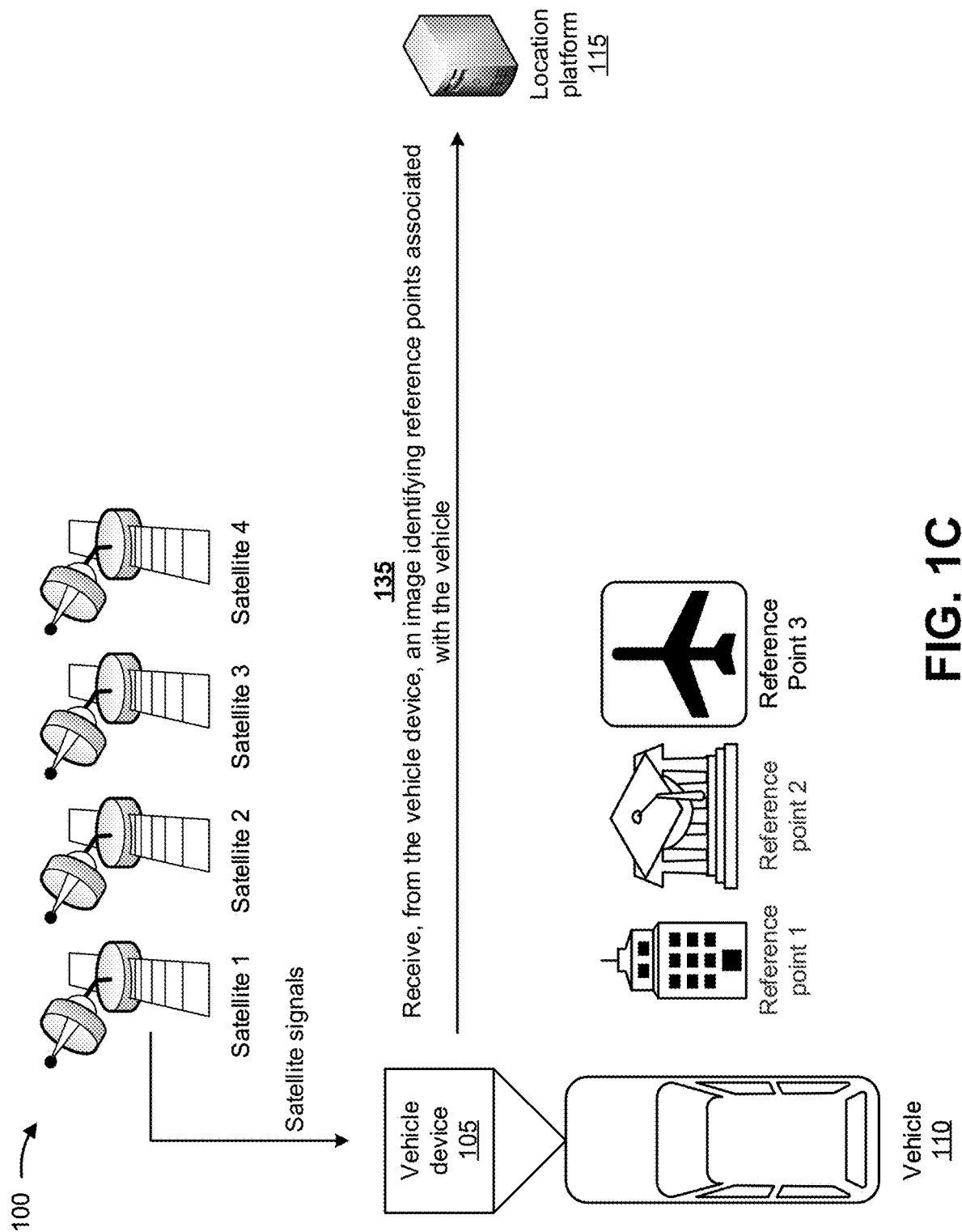

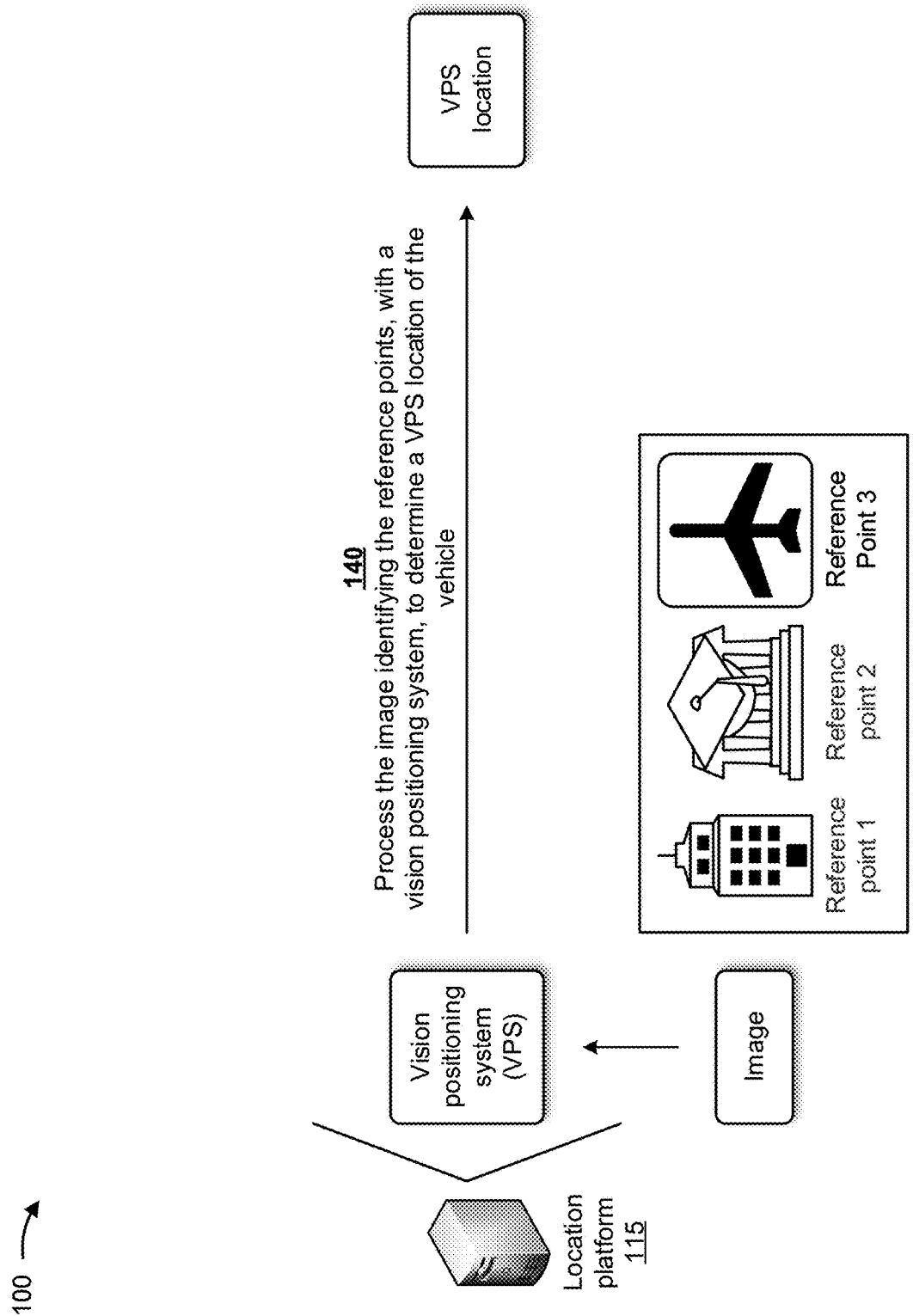

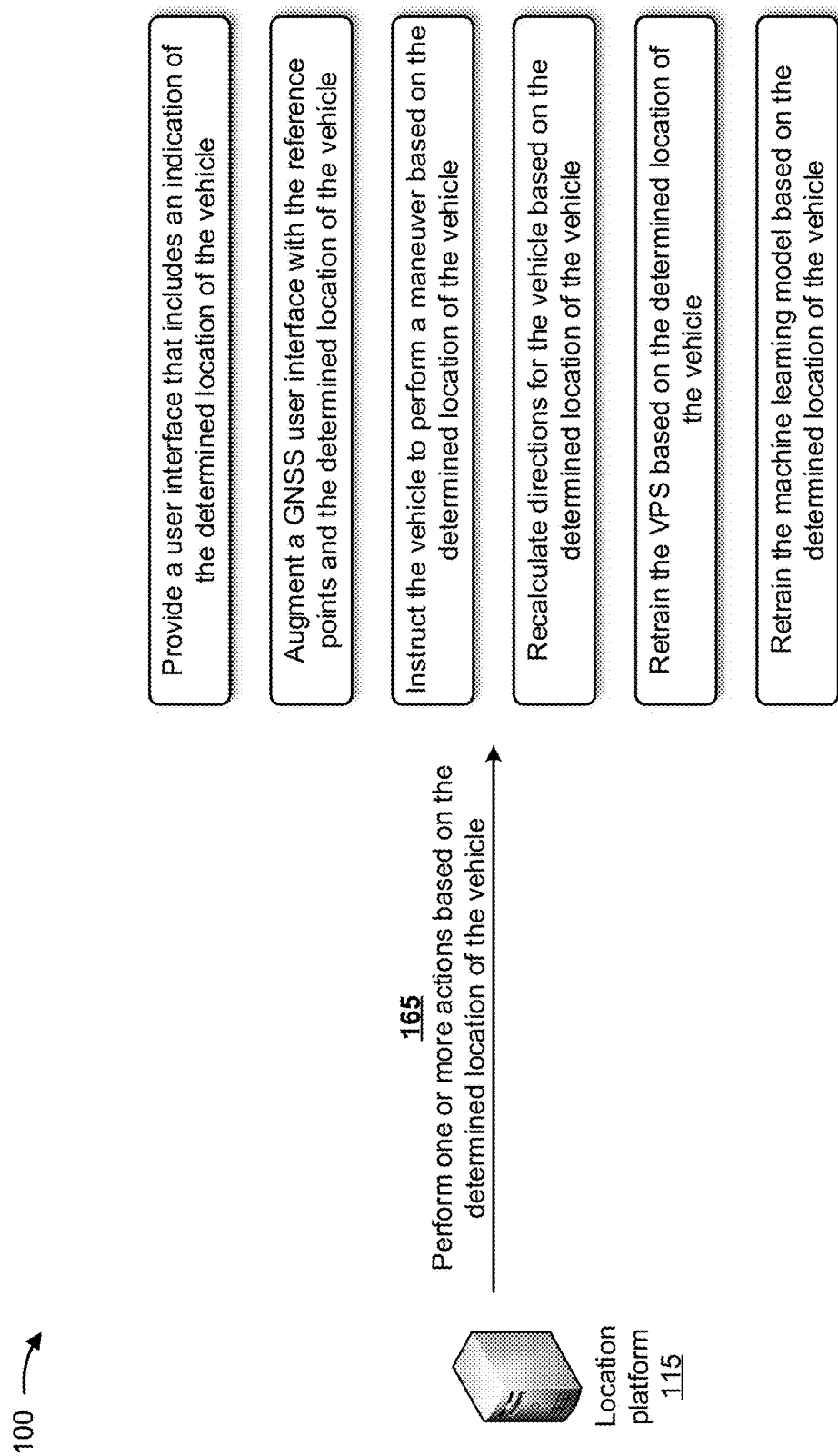

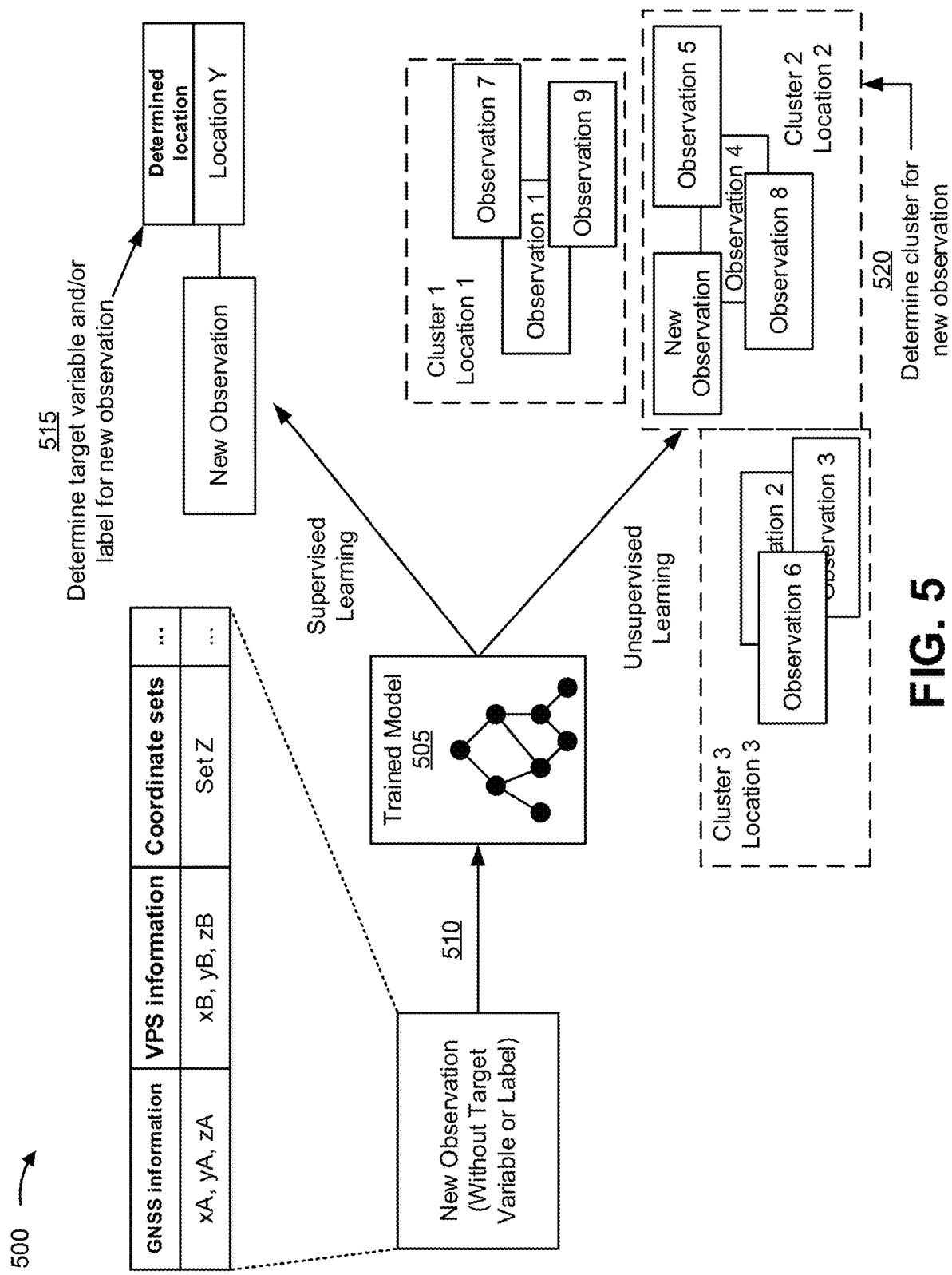

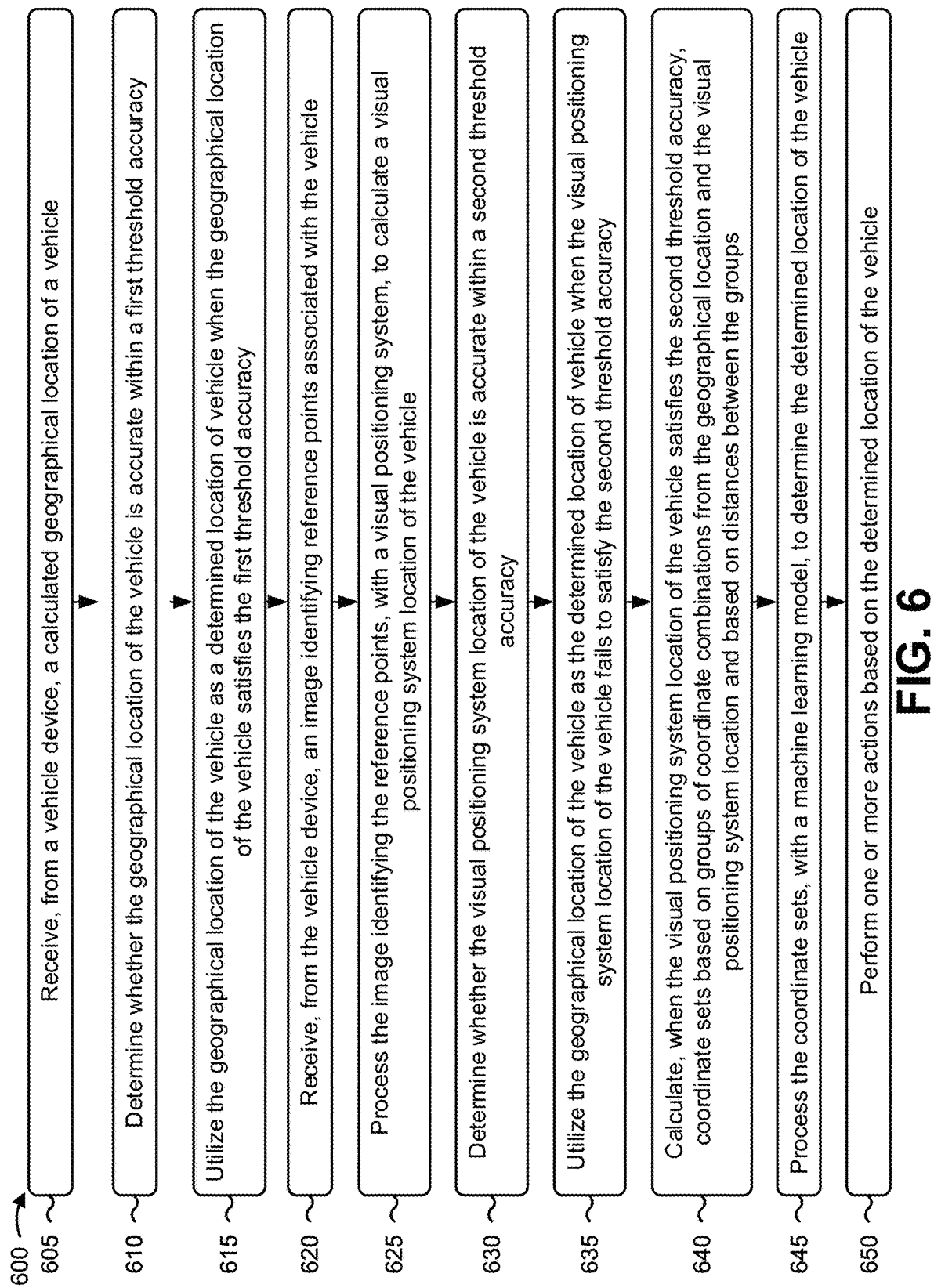

SYSTEMS AND METHODS FOR UTILIZING A MACHINE LEARNING MODEL TO DETERMINE A DETERMINED LOCATION OF A VEHICLE BASED ON A COMBINATION OF A GEOGRAPHICAL LOCATION AND A VISUAL POSITIONING SYSTEM LOCATION

BACKGROUND

Vehicles may be equipped with several vehicle devices that enable capture of sensor data, such as images or video surrounding the vehicle, engine parameters, vehicle operation parameters, and/or the like. For example, a vehicle may include a dash camera, several parking assist cameras, a backup assist camera, an on-board diagnostic (OBD) device, an electronic control unit (ECU), a global navigation satellite system (GNSS) device, and/or the like that enable capture of sensor data for different purposes.

BRIEF DESCRIPTION OF THE DRAWINGS

FIGS. 1A-1H are diagrams of one or more example implementations described herein.

FIG. 5 is a diagram illustrating an example of applying a trained machine learning model to a new observation.

FIG. 6 is a flow chart of an example process for utilizing a machine learning model to determine a determined location of a vehicle based on a combination of a global navigation satellite system location and a visual positioning system location.

DETAILED DESCRIPTION OF PREFERRED EMBODIMENTS

Figure 1A:
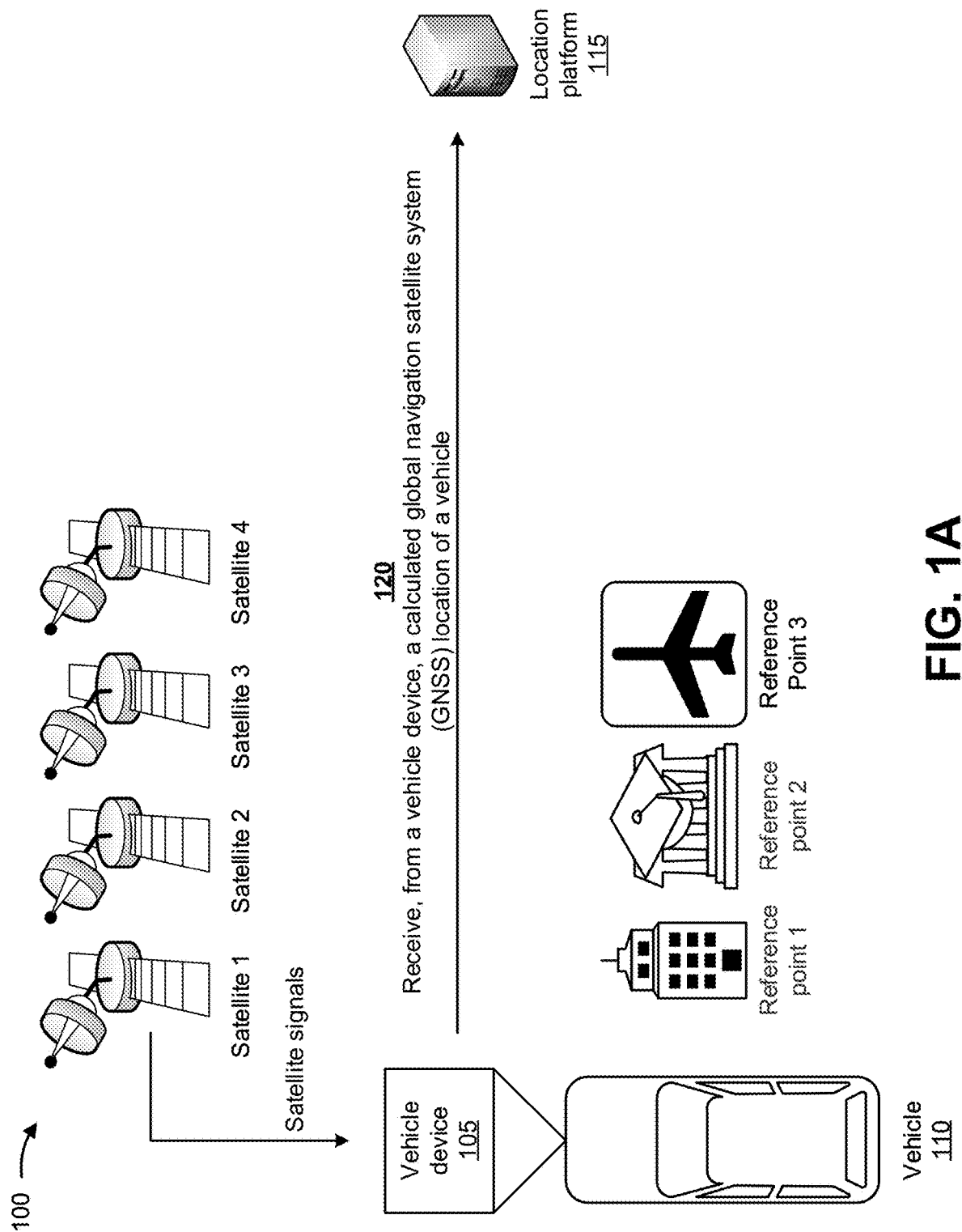

The following detailed description of example implementations refers to the accompanying drawings. The same reference numbers in different drawings may identify the same or similar elements.

A vehicle device (e.g., a global navigation satellite system (GNSS) device) in a vehicle may capture GNSS data (e.g., a longitude, a latitude, a speed, a heading direction, and/or the like) in order to determine a GNSS location of the vehicle. For example, the GNSS device may receive satellite signals from three or more satellites and may calculate the GNSS location of the vehicle based on the satellite signals. However, current techniques for calculating the GNSS location may be ineffective in urban areas due to dilution of precision (e.g., tall buildings may block satellites and only allow a line of sight to satellites visible in a narrow space between buildings), multipath propagation (e.g., buildings reflect the satellite signals and add errors to timing calculations), a small quantity of visible satellites (e.g., buildings limit the quantity of visible satellites), and/or the like. Thus, current techniques for calculating the GNSS location waste computing resources (e.g., processing resources, memory resources, communication resources, and/or the like), networking resources, transportation resources, and/or the like associated with providing incorrect locations to vehicles, providing incorrect directions to vehicles based on the incorrect locations, causing excessive driving due to the incorrect locations, and/or the like.

Some implementations described herein provide a location platform that utilizes a machine learning model to determine a determined location of a vehicle based on a combination of a geographical (e.g., GNSS) location and a visual positioning system (VPS) location of the vehicle. For example, the location platform may receive, from a vehicle device, a calculated GNSS location of a vehicle, and may determine whether the GNSS location of the vehicle is accurate within a first threshold accuracy. The location platform may utilize the GNSS location of the vehicle as a determined location of vehicle when the GNSS location of the vehicle satisfies the first threshold accuracy, and may receive, from the vehicle device, an image identifying reference points associated with the vehicle. The location platform may process the image identifying the reference points, with a VPS, to calculate a VPS location of the vehicle, and may determine whether the VPS location of the vehicle is accurate within a second threshold accuracy. The location platform may utilize the GNSS location of the vehicle as the determined location of vehicle when the VPS location of the vehicle fails to satisfy the second threshold accuracy, and may calculate, when the VPS location of the vehicle satisfies the second threshold accuracy, coordinate sets based on groups of coordinate combinations from the GNSS location and the VPS location and based on distances between the groups. The location platform may process the coordinate sets, with a machine learning model, to determine the determined location of the vehicle, and may perform one or more actions based on the determined location of the vehicle.

In this way, the location platform utilizes a machine learning model to determine a determined location of a vehicle based on a combination of a GNSS location and a VPS location of the vehicle. When the vehicle is located in an urban area (e.g., which can cause the GNSS location to be inaccurate), the location platform may combine the GNSS location and the VPS location of the vehicle to provide a more accurate estimate of the determined location of the vehicle. Thus, the location platform conserves computing resources (e.g., processing resources, memory resources, communication resources, and/or the like), networking resources, transportation resources, and/or the like that would otherwise have been wasted in providing incorrect locations to vehicles, providing incorrect directions to vehicles based on the incorrect locations, causing excessive driving due to the incorrect locations, and/or the like.

Although implementations described herein relate to a GNSS location of a vehicle, a VPS location of the vehicle may be combined with other types of location data (e.g., other GNSS location data), such as location data associated fifth generation (5G)-based positioning, fourth generation (4G) or long term evolution (LTE)-based positioning, Wi-Fi beacon-based positioning, Bluetooth beacon-based positioning, radio signal fingerprinting-based positioning, and/or the like.

FIGS. 1A-1H are diagrams of one or more example implementations 100 described herein. As shown in FIG. 1A, a vehicle device 105 may be associated with a vehicle 110 and a location platform 115. In some implementations, vehicle device 105 may include a device (e.g., an on-board diagnostics (OBD) device, an electronic control unit (ECU), and/or the like) that receives vehicle data (e.g., data indicating acceleration, speed, movement, and/or the like) and/or controls other vehicle devices, a vehicle sensor (e.g., a GNSS device, a gyroscope, an accelerometer, and/or the like) that captures the vehicle data, an image capture device (e.g., a dash camera, a parking assist camera, a backup assist camera, and/or the like) that captures images or video, and/or the like associated with vehicle 110. In some implementations, vehicle device 105 may include a single device that captures the aforementioned vehicle data and/or image data or multiple devices that capture the aforementioned vehicle data and/or image data. Location platform 115 may include a platform that utilizes a machine learning model to determine a determined location of vehicle 110 based on a combination of a GNSS location and a VPS location of vehicle 110. Although some implementations are described herein as being performed by location platform 115, such implementations may be performed solely by vehicle device 105, jointly by vehicle device 105 and location platform 115, or solely by location platform 115. While a vehicle (e.g., the vehicle 110) is depicted in the figures, some implementations described herein are not limited to vehicles. For example, some implementations described herein may also apply to a pedestrian walking with a user device (e.g., a smartphone, and/or the like), and/or the like.

As shown in FIG. 1A, and by reference number 120, location platform 115 may receive, from vehicle device 105, a calculated global navigation satellite system (GNSS) location of the vehicle 110. The calculated GNSS location may have been determined through the vehicle device 105 located on the vehicle 110. For example, the vehicle device 105 (e.g., using a vehicle sensor such as a GNSS device and/or the like) may have obtained information from a set of satellites (e.g., satellite 1, satellite 2, satellite 3, satellite 4, and/or the like) indicating satellite coordinates for the vehicle 110. Each satellite, of the set of satellites, may send a respective set of satellite coordinates for the vehicle 110. The vehicle device 105 may combine the multiple sets of satellite coordinates from the set of satellites to determine a GNSS location. For example, the calculated GNSS location may have been calculated using the following equation:

$$(x-x_i)^2+(y-y_i)^2+(z-z_i)^2=c^2(\Delta t+clk_{error})^2, \text{ where}$$

$x_i$, $y_i$, $z_i$=satellite coordinates,
x, y, z=receiver coordinates,
c=speed of light,
$\Delta t$=time-of-travel of the GNSS signal, and
$clk_{error}$=clock error between receiver and satellites.

In some implementations, the multiple sets of satellite coordinates may be used with the above equation to output a set of spheres, where each sphere is formed from a respective set of satellite coordinates. Each sphere may encapsulate a possible area in which the vehicle device 105 and/or vehicle 110 is located. In some implementations, one or more of the set of spheres may overlap. For example, in a 2-plane coordinate system, two spheres may overlap, resulting in two intersecting points and therefore two possible location coordinates. In some implementations, the set of spheres may converge at a single point (e.g., at least four spheres in a 3-plane coordinate system), resulting in one possible set of location coordinates. The single point of convergence may be used as the calculated GNSS location. In some implementations, the spheres may not intercept at a single point but instead surround an area in space. This may occur due to various sources of error and inaccuracies, such as atmospheric effects, dilution of precision, multipath propagation, clock synchronization, clock accuracy at a receiver, and/or the like.

Figure 1B:
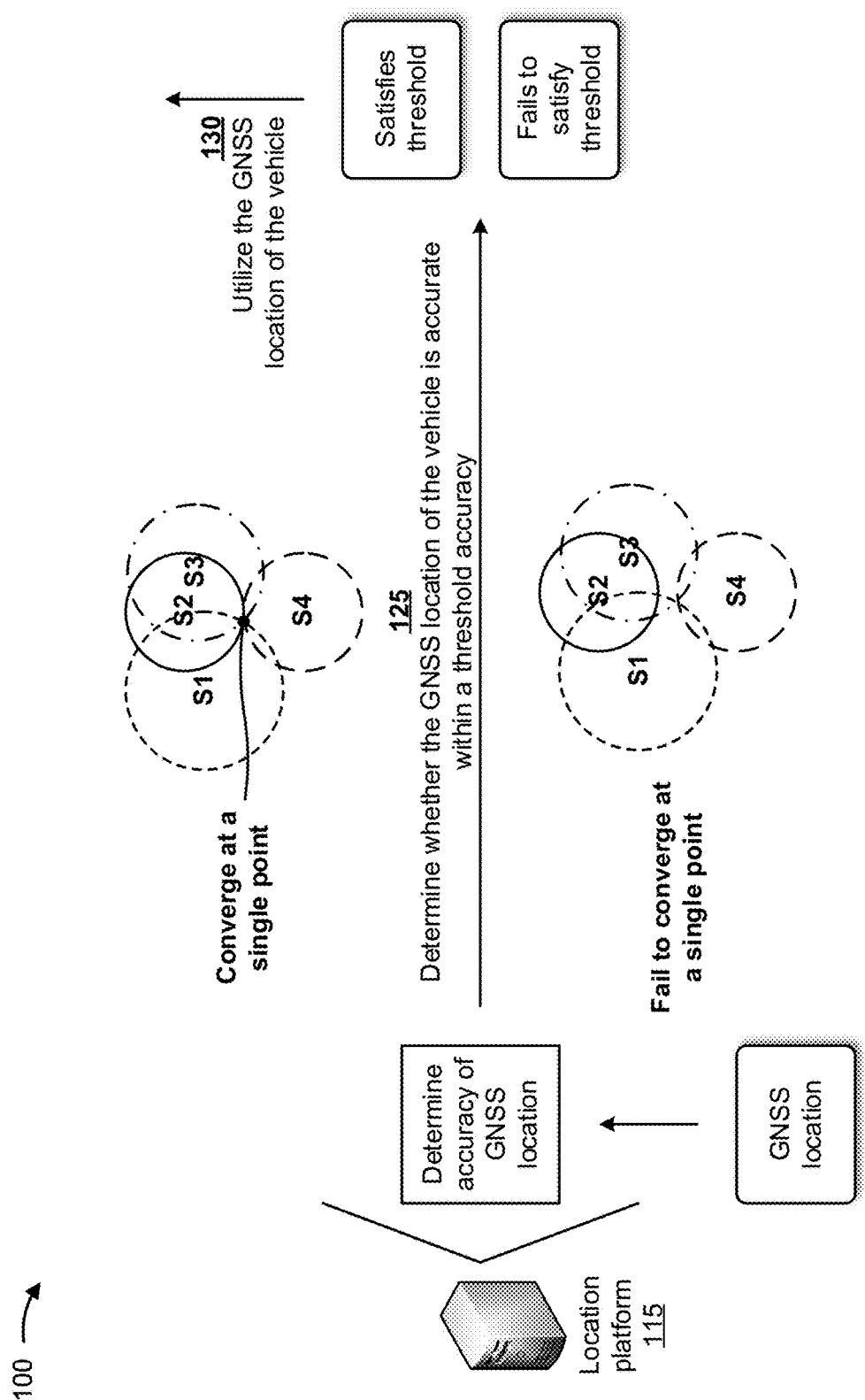

As shown in FIG. 1B, and by reference number 125, the location platform 115 may determine whether the GNSS location of the vehicle is accurate within a threshold accuracy. For example, the location platform 115 may determine whether the spheres formed using the above equation converge at a single point. In some implementations, the threshold accuracy may be based on how many spheres intercept, a size of the area the sphere surround, and/or the like.

As shown in FIG. 1B, and by reference number 130, the location platform 115 may determine to utilize the GNSS location of the vehicle 110 if the GNSS location satisfies the threshold accuracy. In some implementations, the location platform 115 may determine to not utilize the GNSS location of the vehicle 110 if the GNSS location does not satisfy the threshold accuracy. In this case, the location platform 115 may determine to utilize another GNSS location of the vehicle 110 that may be received by the location platform 115. In this way, the location platform 115 may determine whether the GNSS location is accurate enough to use as a location of the vehicle, whether to augment the GNSS location with other location information, and/or the like.

As shown in FIG. 1C, and by reference number 135, the location platform 115 may receive, from the vehicle device 105, an image identifying reference points associated with the vehicle. The reference points may include buildings, airports, landmarks, and/or the like (e.g., reference point 1, reference point 2, reference point 3, and/or the like). In some implementations, the reference points may include well-known buildings, airports, landmarks, and/or the like in which the location platform 115 may be able to determine a location.

In some implementations, the image may be taken from one or more cameras associated with the vehicle 110, such as the vehicle device 105. In some implementations, in order for the vehicle device 105 to capture, store, collect, process, communicate, and/or the like the sensor data and/or the image data, the vehicle device 105 may include or receive information from one or more cameras and/or recorders (e.g., a front-facing camera/recorder, a side camera/recorder, a rear-facing camera/recorder, and/or the like). These functionalities may be provided by a single device, or by multiple on-board components or devices, of the vehicle device 105 and/or the vehicle 110. In some implementations, the components may execute completely on the vehicle device 105. Additionally, or alternatively, some or all of the components may be distributed and may communicate with the vehicle device 105. For example, fast procedures may be executed by vehicle device 105 and computing-intensive procedures may be executed by the location platform 115 or a combination of the vehicle device 105 and the location platform 115.

For example, the vehicle device 105 may include a vehicle tracking unit device with telematics sensors and data connectivity, and may include a front-facing dashboard camera (or dash cam) that may be equipped with telematics sensors and data connectivity (e.g., a "smart" dashcam) or may be purely a recorder (e.g., a "dumb" dashcam) connected to the vehicle tracking unit device. The vehicle tracking unit device may be an external device that is mounted in the vehicle 110 to track the GNSS position and telematics behavior of the vehicle 110, or may be an internal component of the vehicle 110 that is able to store and transmit telematics data.

In some implementations, the location platform 115 may receive, from the vehicle device 105, additional information about the image and/or the vehicle 110. For example, the location platform 115 may receive information associated with camera hardware associated with the image, such as a focal length associated with the image, a lens type associated with the image, and/or the like. In some implementations, the location platform 115 may receive additional information associated with the vehicle 110. For example, the location platform 115 may obtain a sample timestamp, a direction of the vehicle 110, speed information associated with the vehicle 110, acceleration data associated with the vehicle 110, and/or the like.

As shown in FIG. 1D, and by reference number 140, the location platform 115 may process the image identifying the reference points, with a vision positioning system (VPS), to determine a VPS location of the vehicle. For example, in some implementations, the location platform 115 may perform image processing to identify one or more reference points from the images. In some implementations, the location platform 115 may use vehicle device information (e.g., focal length of a lens and/or the like), image information (e.g., height of a reference point in the image, and/or the like) and information known about a reference point (e.g., height of a known reference point) to determine a relative distance of the reference point to the vehicle device 105 and/or the vehicle 110. For example, the location platform 115 may use the equations below to determine the relative position of the one or more reference points to the vehicle device 105 and/or the vehicle 110:

$$d = \frac{fH}{h},$$

$$D^2 = (d+f)^2 + H^2,$$

$$(x-x_i)^2 + (y-y_i)^2 + (z-z_i)^2 = D^2,$$

$d$ = distance of the reference point to the lens focus, $f$ = focal length, $h$ = image height, $H$ = reference point height, and $D$ = distance to the reference point.

Based on determining the relative position of the one or more reference points to the vehicle device 105 and/or the vehicle 110, the location platform 115 may use information obtained about the reference points (e.g., known location data about the reference points) to determine the VPS location of the vehicle 110. For example, the location platform 115 may use the following equations to generate a set of spheres, where each sphere corresponds to a reference point:

$$(x-x_i)^2+(y-y_i)^2+(z-z_i)^2=D^2,$$

D=distance to the reference point, $x_i, y_i, z_i$=coordinates to the reference points with respect to the GNSS coordinate system, and $x, y, z$=coordinates to the reference points with respect to the GNSS coordinate system.

Similar to what was described in relation to FIG. 1B, each sphere may represent a possible set of location coordinates for the vehicle 110. In some implementations, one or more of the set of spheres may overlap. For example, in a 3-plane coordinate system, two sets of spheres may overlap, resulting in three possible sets of location coordinates. In some implementations, the set of spheres may converge at a single point (e.g., at least four spheres in a 3-plane coordinate system), resulting in one possible set of location coordinates. The single point of convergence may be used as a VPS position. In some implementations, the spheres may not intercept at a single point but instead surround an area in space.

Figure 1E:
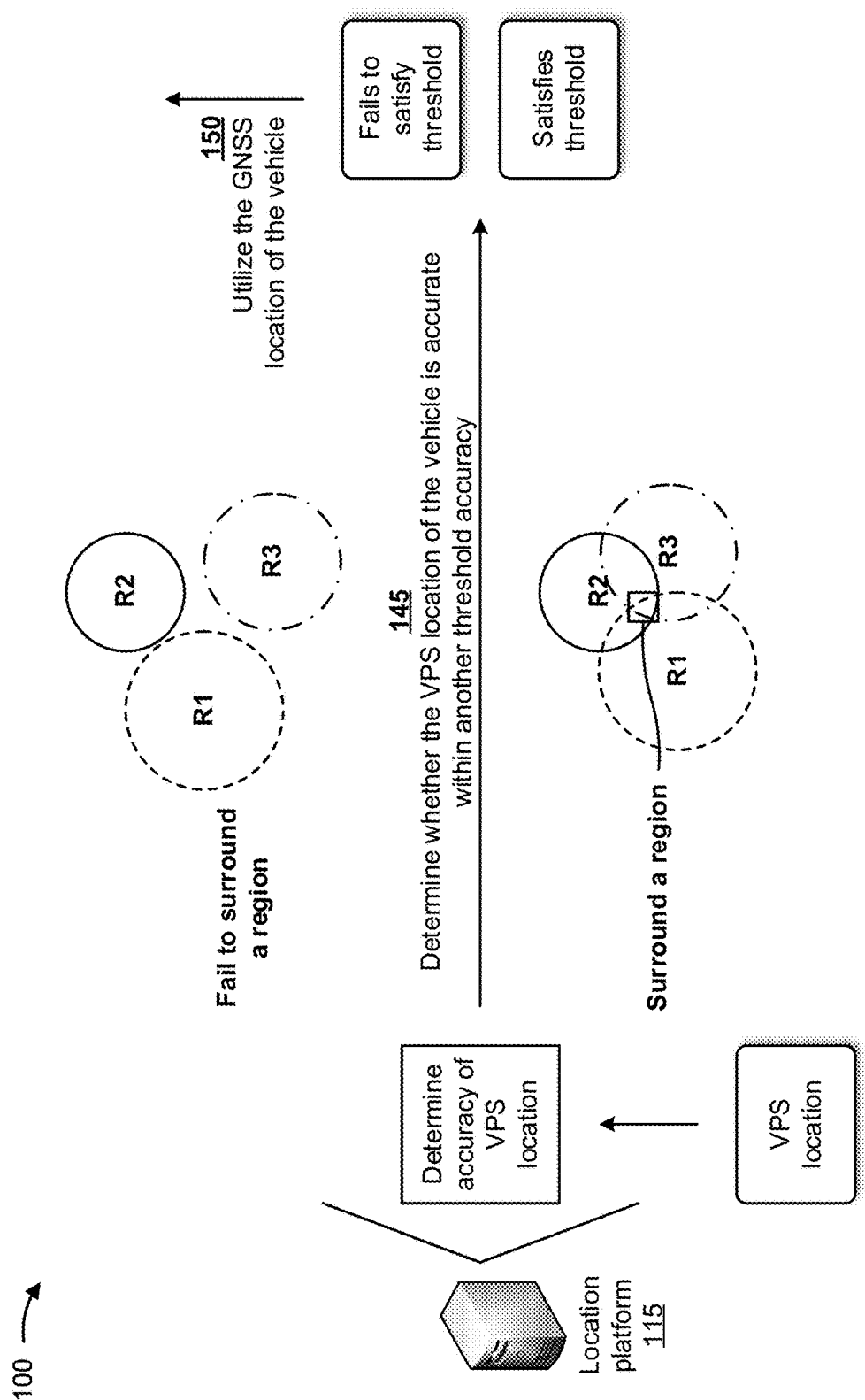

As shown in FIG. 1E, and by reference number 145, the location platform 115 may determine whether the VPS location of the vehicle is accurate within another threshold accuracy. For example, the location platform 115 may determine whether the spheres formed using the above equation converge at a single point. In some implementations, the threshold accuracy may be based on how many spheres intercept, a size of the area the sphere surround, and/or the like. The location platform 115 may determine to utilize the VPS location of the vehicle 110 if the VPS location satisfies the threshold accuracy. In some implementations, the location platform 115 may determine to not utilize the VPS location of the vehicle 110 if the VPS location does not satisfy the threshold accuracy. As shown in FIG. 1E, and by reference number 150, the location platform 115 may determine to utilize the GNSS location of the vehicle based on the VPS location of the vehicle failing to satisfy the threshold accuracy. In this way, the VPS location may not augment the GNSS location of the vehicle if it is not determined to be useful. In this case, the location platform 115 may determine to use solely the GNSS location of the vehicle as a location of the vehicle, obtain other information to determine the location of the vehicle, and/or the like.

Figure 1F:
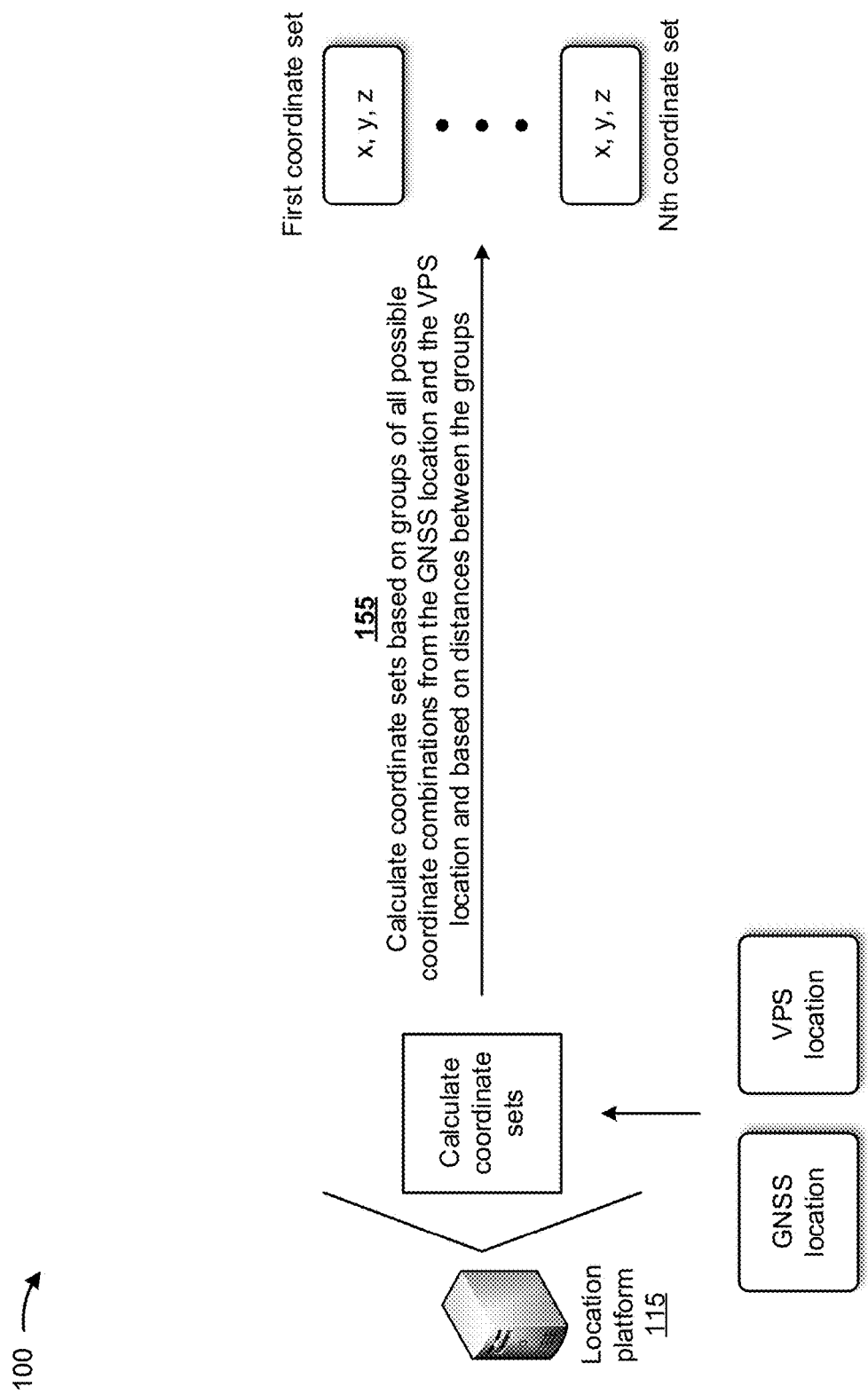

As shown in FIG. 1F, and by reference number 155, the location platform 115 may calculate coordinate sets based on groups of all possible coordinate combinations from the GNSS location and the VPS location and based on distances between the groups. For example, the location platform 115 may calculate possible coordinate sets based on forming all combinations of the satellite coordinates and the reference point coordinates in sets of three. Each set may be used in conjunction with the aforementioned equations to generate spheres and identify location coordinate candidates. For example, a set of three possible coordinate sets (e.g., any combination of the satellite coordinate sets and reference point coordinate sets) may be used to output a set of three spheres using the equations mentioned above. If the spheres intersect, the intersecting point may be used as a location coordinate set candidate. If the spheres do not intersect, the set may be discarded. This process may be repeated for all possible coordinate combinations, until there is a list of location coordinate set candidates. The location platform 115 may assess each location coordinate set candidate for a likelihood of accuracy. In this way, the location platform 115 may generate sets of possible location coordinates and may evaluate each set of possible location coordinates to determine an accurate location.

Figure 1G:
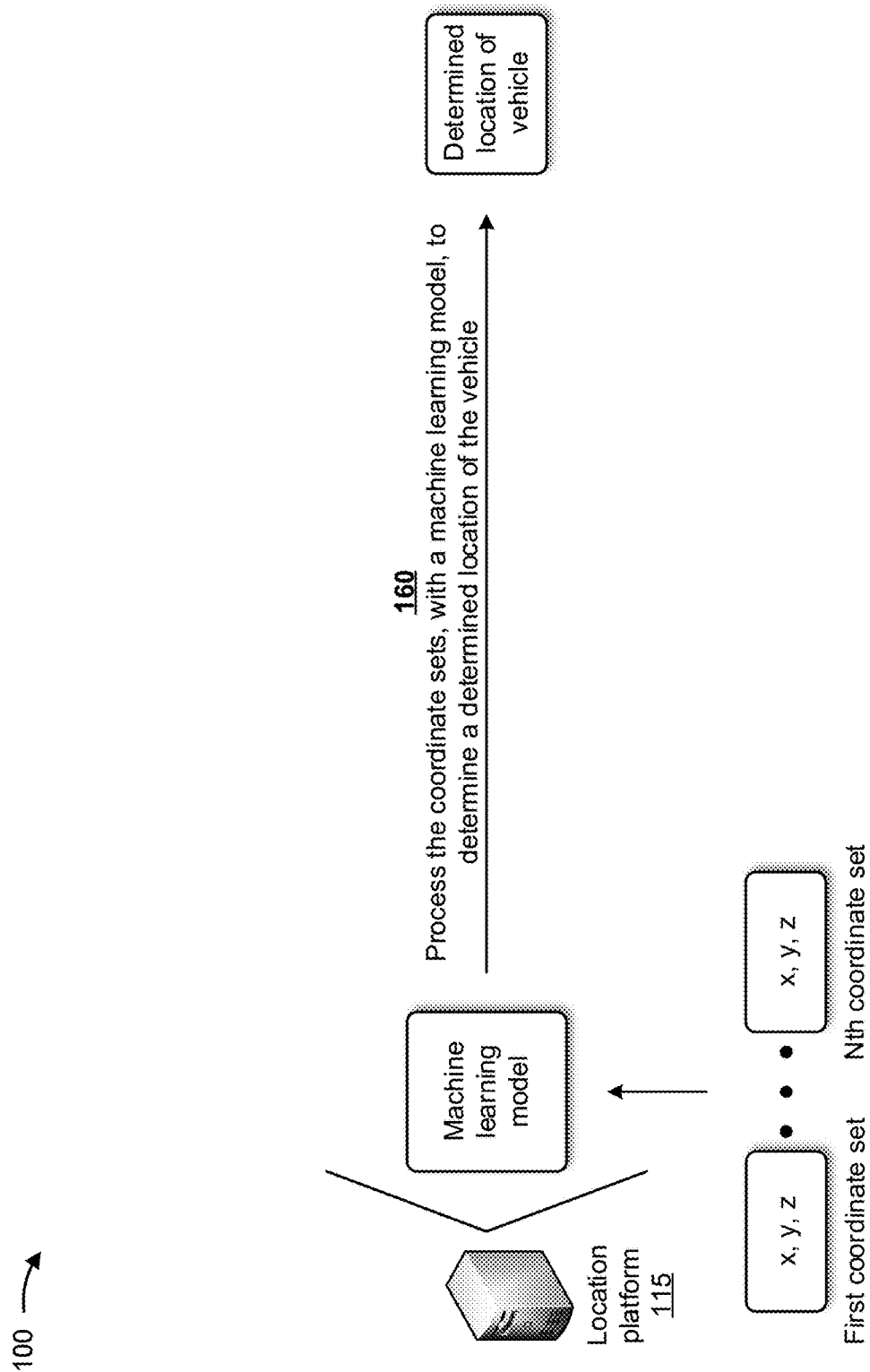

As shown in FIG. 1G, and by reference number 160, the location platform 115 may process the coordinate sets, with a machine learning model, to determine a determined location of the vehicle 110. The machine learning model may be a clustering model, a random forest model, a decision tree model, a k-means model, a density-based spatial clustering of applications with noise (DBSCAN) model, an expectation maximization (EM) model, a clustering using a Gaussian mixture model (GMM), and/or the like. In some implementations, the location platform 115 may train the machine learning model with historical data (e.g., historical coordinate sets) to enable the machine learning model to determine a determined location of a vehicle. For example, the location platform 115 may train the machine learning model in a manner similar to the manner described below in connection with FIG. 4. In some implementations, rather than training the machine learning model, the location platform 115 may obtain the machine learning model from another system or device that trained the machine learning model. In this case, the location platform 115 may provide the other system or device with historical data for use in training the machine learning model, and may provide the other system or device with updated historical data to retrain the machine learning model in order to update the machine learning model. In some implementations, the location platform 115 may process the coordinate sets, with the machine learning model, to predict a determined location of the vehicle 110. For example, the location platform 115 may apply the machine learning model to new observations (e.g., the coordinate sets) in a manner similar to the manner described below in connection with FIG. 5.

As shown in FIG. 1H, and by reference number 165, the location platform 115 may perform one or more actions based on the determined location of the vehicle 110. In some implementations, the location platform 115 may provide information based on the determined location of the vehicle 110, such as providing a user interface that includes an indication of the determined location of the vehicle 110, and/or the like. In some implementations, the location platform 115 may perform one or more actions concerning the vehicle 110, such as instructing the vehicle 110 to perform a maneuver based on the determined location, recalculating directions for the vehicle based on the determined location, and/or the like. In some implementations, the one or more actions may include vehicle device 105 and/or location platform 115 retraining one or more of the models described above based on the determined location of the vehicle 110. In this way, vehicle device 105 and/or location platform 115 may improve the accuracy of the models in determining the determined location of a vehicle, determining whether to perform further processing or not, and/or the like, which may improve speed and efficiency of the models and conserve computing resources, networking resources, and/or the like.

In this way, several different stages of the process for determining a determined location of a vehicle based on a combination of a GNSS location and a VPS location of the vehicle are automated with a machine learning model, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes a machine learning model to determine a determined location of a vehicle based on a combination of a GNSS location and a VPS location of the vehicle in the manner described herein. Finally, the process for utilizing a machine learning model to determine a determined location of a vehicle based on a combination of a GNSS location and a VPS location of the vehicle conserves computing resources, networking resources, transportation resources, and/or the like that would otherwise be wasted in providing incorrect locations to vehicles, providing incorrect directions to vehicles based on the incorrect locations, causing excessive driving due to the incorrect locations, and/or the like.

As indicated above, FIGS. 1A-1H are provided merely as examples. Other examples may differ from what is described with regard to FIGS. 1A-1H. The number and arrangement of devices and networks shown in FIGS. 1A-1H are provided as an example. In practice, there may be additional devices and/or networks, fewer devices and/or networks, different devices and/or networks, or differently arranged devices and/or networks than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) of FIGS. 1A-1H may perform one or more functions described as being performed by another set of devices of FIGS. 1A-1H.

Figure 2:
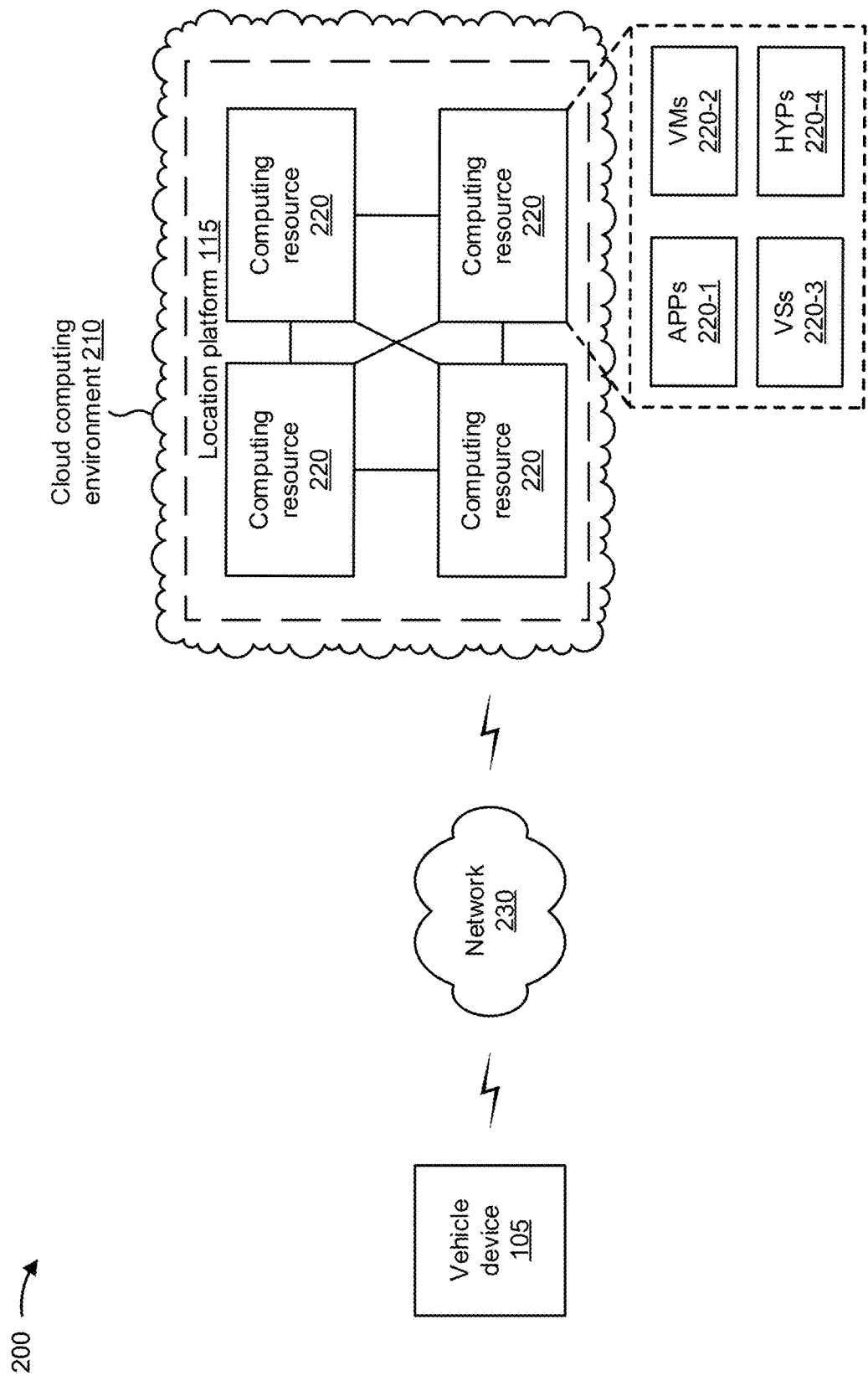
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicle device 105, location platform 115, and a network 230. Devices of environment 200 may interconnect via wired connections, wireless connections, or a combination of wired and wireless connections.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a global navigation satellite system (GNSS) device, an OBD device, an ECU, a gyroscope, a dash camera, a parking assist camera, a backup assist camera, and/or the like), or a similar type of device. In some implementations, vehicle device 105 may receive information from and/or transmit information to location platform 115.

Location platform 115 includes one or more devices that utilize a machine learning model to determine a determined location of vehicle 110 based on a combination of a GNSS location and a VPS location of vehicle 110. In some implementations, location platform 115 may be designed to be modular such that certain software components may be swapped in or out depending on a particular need. As such, location platform 115 may be easily and/or quickly reconfigured for different uses. In some implementations, location platform 115 may receive information from and/or transmit information to one or more vehicle devices 105.

In some implementations, as shown, location platform 115 may be hosted in a cloud computing environment 210. Notably, while implementations described herein describe location platform 115 as being hosted in cloud computing environment 210, in some implementations, location platform 115 may not be cloud-based (i.e., may be implemented outside of a cloud computing environment) or may be partially cloud-based.

Cloud computing environment 210 includes an environment that hosts location platform 115. Cloud computing environment 210 may provide computation, software, data access, storage, etc., services that do not require end-user knowledge of a physical location and configuration of system(s) and/or device(s) that hosts location platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host location platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by vehicle device 105. Application 220-1 may eliminate a need to install and execute the software applications on vehicle device 105. For example, application 220-1 may include software associated with location platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of vehicle device 105 or an operator of location platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
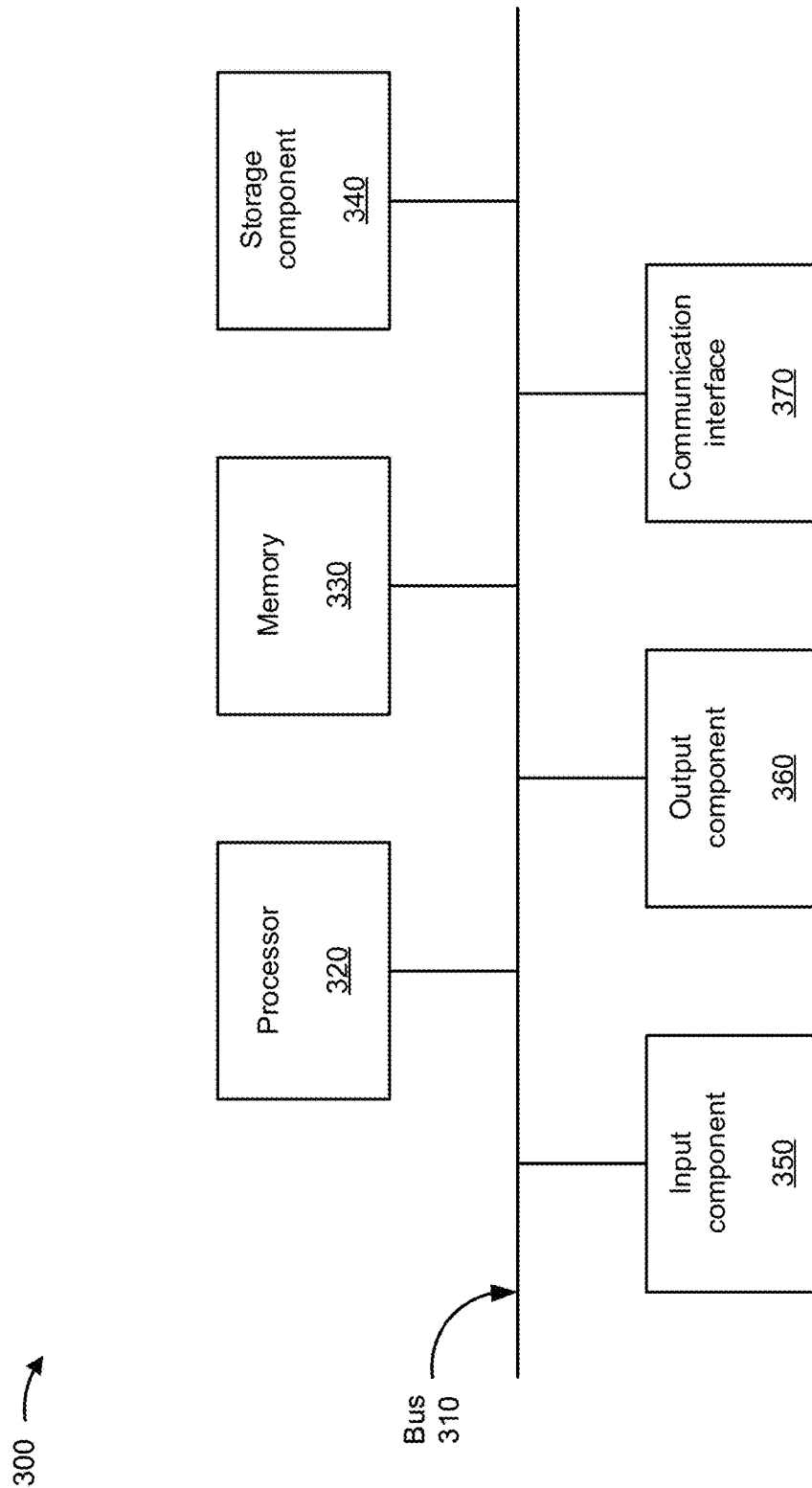
FIG. 3 is a diagram of example components of one or more devices of FIG. 2.

FIG. 3 is a diagram of example components of a device 300. Device 300 may correspond to vehicle device 105, location platform 115, and/or computing resource 220. In some implementations, vehicle device 105, location platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global navigation satellite system (GNSS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
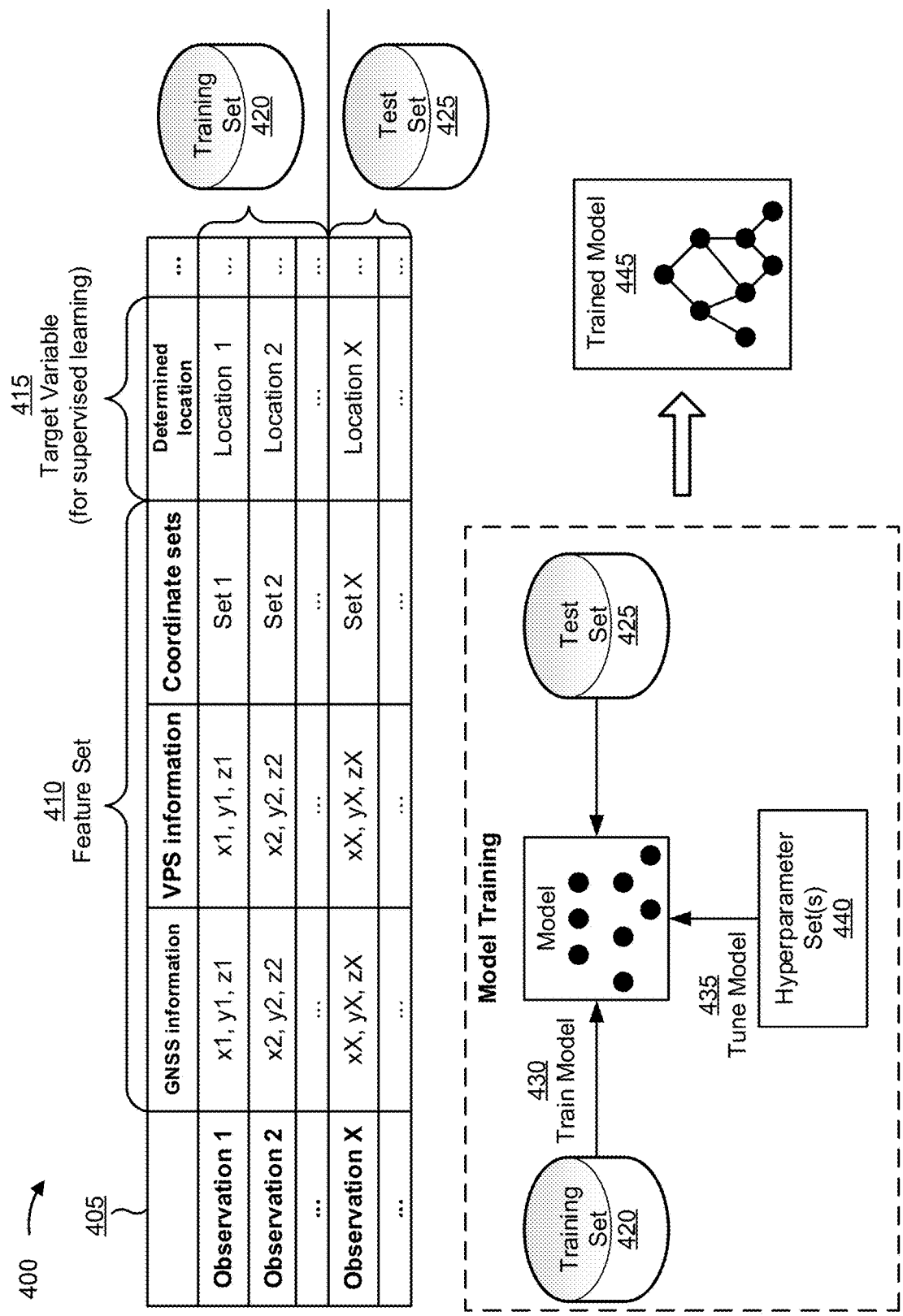
FIG. 4 is a diagram illustrating an example of training a machine learning model.

FIG. 4 is a diagram illustrating an example 400 of training a machine learning model. The machine learning model training described herein may be performed using a machine learning system. The machine learning system may include a computing device, a server, a cloud computing environment, and/or the like, such as vehicle device 105, location platform 115, and/or a device separate from vehicle device 105 and location platform 115.

As shown by reference number 405, a machine learning model may be trained using a set of observations. The set of observations may be obtained and/or input from historical data, such as data gathered during one or more processes described herein. For example, the set of observations may include data gathered from vehicle devices 105, as described elsewhere herein. In some implementations, the machine learning system may receive the set of observations (e.g., as input) from vehicle devices 105.

As shown by reference number 410, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from vehicle device 105. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from vehicle device 105, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of a GNSS information (e.g., a GNSS location, measure of accuracy of a GNSS location, and/or the like), a second feature of a VPS information (e.g., a VPS location, measure of accuracy of a VPS location, and/or the like), a third feature of coordinate sets, and so on. As shown, for a first observation, the first feature may have a value of x1, y1, z1, the second feature may have a value of x1, y1, z1, the third feature may have a value of set 1, and so on. These features and feature values are provided as examples, and may differ in other examples. For example, the feature set may include one or more of the following features: GNSS information, VPS information, coordinate sets, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 415, the set of observations may be associated with a target variable type (e.g., a determined location). The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 420 that includes a first subset of observations, of the set of observations, and a test set 425 that includes a second subset of observations of the set of observations. The training set 420 may be used to train (e.g., fit, tune, and/or the like) the machine learning model, while the test set 425 may be used to evaluate a machine learning model that is trained using the training set 420. For example, for supervised learning, the test set 425 may be used for initial model training using the first subset of observations, and the test set 425 may be used to test whether the trained model accurately predicts target variables in the second subset of observations. In some implementations, the machine learning system may partition the set of observations into the training set 420 and the test set 425 by including a first portion or a first percentage of the set of observations in the training set 420 (e.g., 75%, 80%, or 85%, among other examples) and including a second portion or a second percentage of the set of observations in the test set 425 (e.g., 25%, 20%, or 15%, among other examples). In some implementations, the machine learning system may randomly select observations to be included in the training set 420 and/or the test set 425.

As shown by reference number 430, the machine learning system may train a machine learning model using the training set 420. This training may include executing, by the machine learning system, a machine learning algorithm to determine a set of model parameters based on the training set 420. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 420). For example, for a regression algorithm, a model parameter may include a regression coefficient (e.g., a weight). For a decision tree algorithm, a model parameter may include a decision tree split location, as an example.

As shown by reference number 435, the machine learning system may use one or more hyperparameter sets 440 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 420. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 420. The machine learning system may tune each machine learning algorithm using one or more hyperparameter sets 440 (e.g., based on operator input that identifies hyperparameter sets 440 to be used, based on randomly generating hyperparameter values, and/or the like). The machine learning system may train a particular machine learning model using a specific machine learning algorithm and a corresponding hyperparameter set 440. In some implementations, the machine learning system may train multiple machine learning models to generate a set of model parameters for each machine learning model, where each machine learning model corresponds to a different combination of a machine learning algorithm and a hyperparameter set 440 for that machine learning algorithm.

In some implementations, the machine learning system may perform cross-validation when training a machine learning model. Cross validation can be used to obtain a reliable estimate of machine learning model performance using only the training set 420, and without using the test set 425, such as by splitting the training set 420 into a number of groups (e.g., based on operator input that identifies the number of groups, based on randomly selecting a number of groups, and/or the like) and using those groups to estimate model performance. For example, using k-fold cross-validation, observations in the training set 420 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 440 associated with a particular machine learning algorithm. The machine learning system may compare the overall cross-validation scores for different hyperparameter sets 440 associated with the particular machine learning algorithm, and may select the hyperparameter set 440 with the best (e.g., highest accuracy, lowest error, closest to a desired threshold, and/or the like) overall cross-validation score for training the machine learning model. The machine learning system may then train the machine learning model using the selected hyperparameter set 440, without cross-validation (e.g., using all of data in the training set 420 without any hold-out groups), to generate a single machine learning model for a particular machine learning algorithm. The machine learning system may then test this machine learning model using the test set 425 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 445 to be used to analyze new observations, as described below in connection with FIG. 5.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 420 (e.g., without cross-validation), and may test each machine learning model using the test set 425 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 445.

As indicated above, FIG. 4 is provided as an example. Other examples may differ from what is described in connection with FIG. 4. For example, the machine learning model may be trained using a different process than what is described in connection with FIG. 4. Additionally, or alternatively, the machine learning model may employ a different machine learning algorithm than what is described in connection with FIG. 4, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

FIG. 5 is a diagram illustrating an example 500 of applying a trained machine learning model to a new observation. The new observation may be input to a machine learning system that stores a trained machine learning model 505. In some implementations, the trained machine learning model 505 may be the trained machine learning model 445 described above in connection with FIG. 4. The machine learning system may include a computing device, a server, a cloud computing environment, and/or the like, such as location platform 115.

As shown by reference number 510, the machine learning system may receive a new observation (or a set of new observations), and may input the new observation to the machine learning model 505. As shown, the new observation may include a first feature of GNSS information (e.g., a GNSS location, measure of accuracy of a GNSS location, and/or the like), a second feature of a VPS information (e.g., a VPS location, measure of accuracy of a VPS location, and/or the like), a third feature of coordinate sets, and so on, as an example. The machine learning system may apply the trained machine learning model 505 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 505 may predict a value of location Y for the target variable of a determined location for the new observation, as shown by reference number 515. Based on this prediction (e.g., based on the value having a particular label/classification, based on the value satisfying or failing to satisfy a threshold, and/or the like), the machine learning system may provide a recommendation, such as location Y is the determined location of vehicle 110. Additionally, or alternatively, the machine learning system may perform an automated action and/or may cause an automated action to be performed (e.g., by instructing another device to perform the automated action), such as providing the location Y to vehicle device 105. As another example, if the machine learning system were to predict a value of location Z for the target variable of the determined location, then the machine learning system may provide a different recommendation (e.g., location Z is the determined location of vehicle 110) and/or may perform or cause performance of a different automated action (e.g., providing location Z to vehicle device 105). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 505 may classify (e.g., cluster) the new observation in a first location cluster, as shown by reference number 520. The observations within a cluster may have a threshold degree of similarity. Based on classifying the new observation in the first location cluster, the machine learning system may provide a recommendation, such as indicating that location Y is the determined location of vehicle 110, providing directions based on location Y, and/or the like. Additionally, or alternatively, the machine learning system may perform an automated action and/or may cause an automated action to be performed (e.g., by instructing another device to perform the automated action), such as providing location Y to vehicle device 105. As another example, if the machine learning system were to classify the new observation in a second location cluster, then the machine learning system may provide a different recommendation (e.g., location Z is the determined location of vehicle 110) and/or may perform or cause performance of a different automated action (e.g., indicating that location Z is the determined location of vehicle 110).

In this way, the machine learning system may apply a rigorous and automated process to determine a determined location of vehicle 110 based on a combination of a GNSS location and a VPS location of vehicle 110. The machine learning system enables recognition and/or identification of tens, hundreds, thousands, or millions of features and/or feature values for tens, hundreds, thousands, or millions of observations, thereby increasing an accuracy and consistency of the determined location of vehicle 110 relative to requiring computing resources to be allocated for tens, hundreds, or thousands of operators to manually determine the determined location of vehicle 110 using the features or feature values.

As indicated above, FIG. 5 is provided as an example. Other examples may differ from what is described in connection with FIG. 5.

FIG. 6 is a flow chart of an example process 600 for utilizing a machine learning model to determine a determined location of a vehicle based on a combination of a geographical location and a VPS location of the vehicle. In some implementations, one or more process blocks of FIG. 6 may be performed by a device (e.g., location platform 115). In some implementations, one or more process blocks of FIG. 6 may be performed by another device or a group of devices separate from or including the device, such as a vehicle device (e.g., vehicle device 105).

As shown in FIG. 6, process 600 may include receiving, from a vehicle device, a calculated geographical location of a vehicle (block 605). For example, the device (e.g., using computing resource 220, processor 320, communication interface 370, and/or the like) may receive, from a vehicle device, a calculated geographical location of a vehicle, as described above. In some implementations, the geographical location of the vehicle may be calculated based on signals generated by at least three satellites, and the visual positioning system location of the vehicle is calculated based on at least three reference points of the reference points.

As further shown in FIG. 6, process 600 may include determining whether the geographical location of the vehicle is accurate within a first threshold accuracy (block 610). For example, the device (e.g., using computing resource 220, processor 320, memory 330, and/or the like) may determine whether the geographical location of the vehicle is accurate within a first threshold accuracy, as described above.

As further shown in FIG. 6, process 600 may include utilizing the geographical location of the vehicle as a determined location of vehicle when the geographical location of the vehicle satisfies the first threshold accuracy (block 615). For example, the device (e.g., using computing resource 220, processor 320, storage component 340, and/or the like) may utilize the geographical location of the vehicle as a determined location of vehicle when the geographical location of the vehicle satisfies the first threshold accuracy, as described above.

As further shown in FIG. 6, process 600 may include receiving, from the vehicle device, an image identifying reference points associated with the vehicle (block 620). For example, the device (e.g., using computing resource 220, processor 320, communication interface 370, and/or the like) may receive, from the vehicle device, an image identifying reference points associated with the vehicle, as described above.

As further shown in FIG. 6, process 600 may include processing the image identifying the reference points, with a visual positioning system, to calculate a visual positioning system location of the vehicle (block 625). For example, the device (e.g., using computing resource 220, processor 320, memory 330, and/or the like) may process the image identifying the reference points, with a visual positioning system, to calculate a visual positioning system location of the vehicle, as described above. In some implementations, processing the image identifying the reference points, with the visual positioning system, to determine the visual positioning system location may include measuring vertical distances between the reference points and a ground indicator using global navigation satellite system coordinates for the reference points; calculating pixel vertical distances between the reference points and the ground indicator based on the image; calculating a size of the image, and utilizing a lens model to determine distances to the reference points based on the vertical distances, the pixel vertical distances, and the size of the image; the distances to reference points generate a set of spheres that indicate the visual positioning system location.

As further shown in FIG. 6, process 600 may include determining whether the visual positioning system location of the vehicle is accurate within a second threshold accuracy (block 630). For example, the device (e.g., using computing resource 220, processor 320, storage component 340, and/or the like) may determine whether the visual positioning system location of the vehicle is accurate within a second threshold accuracy, as described above.

As further shown in FIG. 6, process 600 may include utilizing the geographical location of the vehicle as the determined location of vehicle when the visual positioning system location of the vehicle fails to satisfy the second threshold accuracy (block 635). For example, the device (e.g., using computing resource 220, processor 320, memory 330, and/or the like) may utilize the geographical location of the vehicle as the determined location of vehicle when the visual positioning system location of the vehicle fails to satisfy the second threshold accuracy, as described above.

As further shown in FIG. 6, process 600 may include calculating, when the visual positioning system location of the vehicle satisfies the second threshold accuracy, coordinate sets based on groups of coordinate combinations from the geographical location and the visual positioning system location and based on distances between the groups (block 640). For example, the device (e.g., using computing resource 220, processor 320, storage component 340, and/or the like) may calculate, when the visual positioning system location of the vehicle satisfies the second threshold accuracy, coordinate sets based on groups of coordinate combinations from the geographical location and the visual positioning system location and based on distances between the groups, as described above.

As further shown in FIG. 6, process 600 may include processing the coordinate sets, with a machine learning model, to determine the determined location of the vehicle (block 645). For example, the device (e.g., using computing resource 220, processor 320, memory 330, and/or the like) may process the coordinate sets, with a machine learning model, to determine the determined location of the vehicle, as described above. In some implementations, processing the coordinate sets, with the machine learning model, to determine the determined location of the vehicle may include determining a set of points within a predetermined distance from each coordinate set of the coordinate sets; selecting a particular coordinate set associated with a set of points that includes a greatest quantity of points within the predetermined distance, and calculating the determined location of the vehicle based on a mean of distances associated with the particular coordinate set. In some implementations, the predetermined distance may be modified.

In some implementations, the machine learning model may include a clustering model, a random forest model, a decision tree model, a k-means model, a density-based spatial clustering of applications with noise model, an expectation maximization model, or a clustering using a Gaussian mixture model.

As further shown in FIG. 6, process 600 may include performing one or more actions based on the determined location of the vehicle (block 650). For example, the device (e.g., using computing resource 220, processor 320, memory 330, storage component 340, communication interface 370, and/or the like) may perform one or more actions based on the determined location of the vehicle, as described above. In some implementations, performing the one or more actions may include providing a user interface that includes an indication of the determined location of the vehicle; augmenting a global navigation satellite system user interface with information identifying the reference points and the determined location of the vehicle; or instructing the vehicle to perform a maneuver based on the determined location of the vehicle.

In some implementations, performing the one or more actions may include recalculating directions for the vehicle based on the determined location of the vehicle; retraining the visual positioning system based on the determined location of the vehicle; or retraining the machine learning model based on the determined location of the vehicle.

Process 600 may include additional implementations, such as any single implementation or any combination of implementations described above, below, and/or in connection with one or more other processes described elsewhere herein.

In some implementations, process 600 may include training the machine learning model based on historical geographical locations and historical visual positioning system locations.

In some implementations, process 600 may include calculating directions for the vehicle based on the determined location of the vehicle; and providing information identifying the directions to the vehicle device.

In some implementations, process 600 may include determining route instructions for the vehicle based on the determined location of the vehicle; and providing the driving instructions to the vehicle device.

In some implementations, process 600 may include processing the image identifying the reference points, with the visual positioning system, to calculate the visual positioning system location of the vehicle only when the geographical location of the vehicle fails to satisfy a threshold accuracy.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
   receiving, by a device and from a vehicle device, a calculated geographical location of a vehicle;
   determining, by the device, whether the geographical location of the vehicle is accurate within a first threshold accuracy;
   utilizing, by the device, the geographical location of the vehicle as a determined location of the vehicle when the geographical location of the vehicle satisfies the first threshold accuracy;
   receiving, by the device and from the vehicle device, an image identifying reference points associated with the vehicle;
   processing, by the device, the image identifying the reference points, with a visual positioning system, to calculate a visual positioning system location of the vehicle;
   determining, by the device, whether the visual positioning system location of the vehicle is accurate within a second threshold accuracy;
   utilizing, by the device, the geographical location of the vehicle as the determined location of vehicle when the visual positioning system location of the vehicle fails to satisfy the second threshold accuracy;
   calculating, by the device and when the visual positioning system location of the vehicle satisfies the second threshold accuracy, coordinate sets based on groups of coordinate combinations from the geographical location and the visual positioning system location and based on distances between the groups;
   processing, by the device, the coordinate sets, with a machine learning model, to determine the determined location of the vehicle; and
   performing, by the device, one or more actions based on the determined location of the vehicle.

2. The method of claim 1, wherein performing the one or more actions comprises one or more of:
   providing a user interface that includes an indication of the determined location of the vehicle;
   augmenting a global navigation satellite system user interface with information identifying the reference points and the determined location of the vehicle; or
   instructing the vehicle to perform a maneuver based on the determined location of the vehicle.

3. The method of claim 1, wherein performing the one or more actions comprises one or more of:
   recalculating directions for the vehicle based on the determined location of the vehicle;
   retraining the visual positioning system based on the determined location of the vehicle; or
   retraining the machine learning model based on the determined location of the vehicle.

4. The method of claim 1, wherein processing the image identifying the reference points, with the visual positioning system, to determine the visual positioning system location comprises:
   measuring vertical distances between the reference points and a ground indicator using global navigation satellite system coordinates for the reference points;
   calculating pixel vertical distances between the reference points and the ground indicator based on the image;
   calculating a size of the image; and
   utilizing a lens model to determine distances to the reference points based on the vertical distances, the pixel vertical distances, and the size of the image,
   wherein the distances to reference points generate a set of spheres that indicate the visual positioning system location.

5. The method of claim 1, wherein processing the coordinate sets, with the machine learning model, to determine the determined location of the vehicle comprises:
   determining a set of points within a predetermined distance from each coordinate set of the coordinate sets;
   selecting a particular coordinate set associated with a set of points that includes a greatest quantity of points within the predetermined distance; and
   calculating the determined location of the vehicle based on a mean of distances associated with the particular coordinate set.

6. The method of claim 5, wherein the predetermined distance is capable of being modified.

7. The method of claim 1, wherein the machine learning model includes one or more of:
   a clustering model,
   a random forest model,
   a decision tree model,
   a k-means model,
   a density-based spatial clustering of applications with noise model,
   an expectation maximization model, or
   a clustering using a Gaussian mixture model.

8. A device, comprising:
   one or more processors configured to:
      receive, from a vehicle device, a calculated geographical location of a vehicle;
      receive, from the vehicle device, an image identifying reference points associated with the vehicle;
      process the image identifying the reference points, with a visual positioning system, to calculate a visual positioning system location of the vehicle;
      calculate coordinate sets based on groups of coordinate combinations from the geographical location and the visual positioning system location and based on distances between the groups;
      process the coordinate sets, with a machine learning model, to determine a determined location of the vehicle; and
      perform one or more actions based on the determined location of the vehicle,
         wherein the one or more actions include one or more of:
            providing a user interface that includes an indication of the determined location of the vehicle, augmenting a geographical user interface with information identifying the reference points and the determined location of the vehicle, or instructing the vehicle to perform a maneuver based on the determined location of the vehicle.

9. The device of claim 8, wherein the one or more processors are further configured to:

train the machine learning model based on historical geographical locations and historical visual positioning system locations.

10. The device of claim 8, wherein the machine learning model includes one or more of:

a clustering model,
a random forest model,
a decision tree model,
a k-means model,
a density-based spatial clustering of applications with noise model,
an expectation maximization model, or
a clustering using a Gaussian mixture model.

11. The device of claim 8, wherein the geographical location of the vehicle is calculated based on signals generated by at least three satellites, and wherein the visual positioning system location of the vehicle is calculated based on at least three reference points of the reference points.

12. The device of claim 8, wherein the one or more processors, when performing the one or more actions, are configured to:

calculate directions for the vehicle based on the determined location of the vehicle; and provide information identifying the directions to the vehicle device.

13. The device of claim 8, wherein the vehicle is an autonomous vehicle and the one or more processors, when performing the one or more actions, are configured to:

determine route instructions for the vehicle based on the determined location of the vehicle; and provide the route instructions to the vehicle device.

14. The device of claim 8, wherein the one or more processors, when processing the image identifying the reference points, with the visual positioning system, to calculate the visual positioning system location of the vehicle, are configured to:

process the image identifying the reference points, with the visual positioning system, to calculate the visual positioning system location of the vehicle only when the geographical location of the vehicle fails to satisfy a threshold accuracy.

15. A non-transitory computer-readable medium storing instructions, the instructions comprising:

one or more instructions that, when executed by one or more processors, cause the one or more processors to:
receive, from a vehicle device, a calculated geographical location of a vehicle;
receive, from the vehicle device, an image identifying reference points associated with the vehicle;
process the image identifying the reference points, with a visual positioning system, to calculate a visual positioning system location of the vehicle;
utilize the geographical location of the vehicle as a determined location of the vehicle when the visual positioning system location of the vehicle fails to satisfy a threshold accuracy;
calculate, when the visual positioning system location of the vehicle satisfies the threshold accuracy, coordinate sets based on groups of coordinate combinations from the geographical location and the visual positioning system location and based on distances between the groups;
process the coordinate sets, with a machine learning model, to determine the determined location of the vehicle; and
perform one or more actions based on the determined location of the vehicle.

16. The non-transitory computer-readable medium of claim 15, wherein the one or more instructions, that cause the one or more processors to perform the one or more actions, cause the one or more processors to one or more of:

provide a user interface that includes an indication of the determined location of the vehicle;
augment a global navigation satellite system user interface with information identifying the reference points and the determined location of the vehicle;
instruct the vehicle to perform a maneuver based on the determined location of the vehicle;
recalculate directions for the vehicle based on the determined location of the vehicle;
retrain the visual positioning system based on the determined location of the vehicle; or
retrain the machine learning model based on the determined location of the vehicle.

17. The non-transitory computer-readable medium of claim 15, wherein the one or more instructions, that cause the one or more processors to process the image identifying the reference points, with the visual positioning system, to determine the visual positioning system location, cause the one or more processors to:

measure vertical distances between the reference points and a ground indicator using known global navigation satellite system coordinates for the reference points;
calculate pixel vertical distances between the reference points and the ground indicator based on the image;
calculate a size of the image; and
utilize a lens model to determine distances to the reference points based on the vertical distances, the pixel vertical distances, and the size of the image,
wherein the distances to reference points generate a set of spheres that indicate the visual positioning system location.

18. The non-transitory computer-readable medium of claim 15, wherein the one or more instructions, that cause the one or more processors to process the coordinate sets, with the machine learning model, to determine the determined location of the vehicle, cause the one or more processors to:

determine a set of points within a predetermined distance from each coordinate set of the coordinate sets;
select a particular coordinate set associated with a set of points that includes a greatest quantity points within the predetermined distance; and
calculate the determined location of the vehicle based on a mean of distances associated with the particular coordinate set.

19. The non-transitory computer-readable medium of claim 15, wherein the one or more instructions, when executed by the one or more processors, further cause the one or more processors to:

train the machine learning model based on historical geographical locations and historical visual positioning system locations.

20. The non-transitory computer-readable medium of claim 15, wherein the one or more instructions, that cause the one or more processors to perform the one or more actions, cause the one or more processors to:
 calculate directions for the vehicle based on the determined location of the vehicle; and
 provide information identifying the directions to the vehicle device.

\* \* \* \* \*